United States Patent [19]

Yamaguchi

[11] Patent Number: 4,476,741
[45] Date of Patent: Oct. 16, 1984

[54] TILT TYPE STEERING DEVICE

[75] Inventor: Mikio Yamaguchi, Takasaki, Japan

[73] Assignee: Nippon Seiko K.K., Tokyo, Japan

[21] Appl. No.: 383,495

[22] Filed: Jun. 1, 1982

[30] Foreign Application Priority Data

Jun. 9, 1981 [JP] Japan .................................. 56-87459

[51] Int. Cl.³ .......................... B62D 1/18; G05G 5/06
[52] U.S. Cl. ...................................... 74/493; 74/527;
280/775
[58] Field of Search ................... 74/493, 527; 280/775

[56] References Cited

U.S. PATENT DOCUMENTS

| Re. 27,481 | 9/1972 | Reed et al. | 74/493 |
|---|---|---|---|
| 3,628,396 | 12/1971 | Grobowski | 74/493 |
| 3,718,053 | 2/1973 | Cinadr | 74/493 |
| 4,078,448 | 3/1978 | Naka | 74/493 |
| 4,195,535 | 4/1980 | Broucksou | 74/493 |
| 4,217,792 | 8/1980 | Kesling | 74/493 |
| 4,265,139 | 5/1981 | Logemann | 74/527 |
| 4,279,176 | 7/1981 | Minamitani | 74/527 |
| 4,396,207 | 8/1983 | Okamoto | 74/493 |

*Primary Examiner*—Lawrence J. Staab
*Assistant Examiner*—Michael J. Gonet
*Attorney, Agent, or Firm*—Wyatt, Gerber, Shoup, Scubey & Badie

[57] ABSTRACT

A tilt type steering device comprises an upper bracket provided on an upper column rotatably supporting a upper shaft, a lower bracket provided on a lower column fitted on a lower shaft and having side plates partly overlapping the side plates of the upper bracket, angle limiting mechanism for making the upper bracket tiltable in a predetermined angle range first biasing member for biasing the upper bracket so that the upper bracket tilts in a jumped-up tilt limit direction, a rod member rotatably and axially movably supported by the other portion of the side plate of one of the upper and lower brackets than the overlapping portion, a connecting member fixed to the rod member adjacent to the side plate of the remaining bracket, and having coupling holes, second biasing member for biasing the connecting member axially of the rod member so that the connecting member is urged toward the side plate of the remaining bracket, an operating member for imparting to the rod member rotation and axial movement, selector mechanism provided on the one bracket. The selector mechanism is provided with plural restraining portions around the center of rotation of the rod member with a predetermined selected angle therebetween. An engaging portion is provided on the rod member or the operating member and restrained by one of the restraining portions, and a coupling projection is provided on the side plate of the remaining bracket adjacent to the connecting member and capable of fitting in the coupling holes.

1 Claim, 7 Drawing Figures

TILT TYPE STEERING DEVICE

BACKGROUND OF THE INVENTION

1. Field of the Invention

This invention relates to a tilt type steering device in which the mounting angle of the steering wheel is adjustable, and more particularly to a tilt type steering device in which an upper shaft having the steering wheel mounted thereon and a lower shaft connected to a steering gear are connected together by a universal joint and wherein an upper bracket provided on an upper column rotatably supporting the upper shaft and a lower bracket provided on a lower column fitted on the lower shaft and mounted to a vehicle body portion are arranged such that the side plate of one of the upper and lower brackets overlaps the side plate of the other of the upper and lower brackets and the upper shaft is coupled to the lower shaft so that tilting at a predetermined angle is possible substantially about the center line of the universal joint.

2. Description of the Prior Art

A device disclosed in U.S. application Ser. No. 305,517 has been previously proposed as a device of such type. In this device, to connect the upper and lower columns at a selected inclination, a coupling hole is provided in the side plate of one bracket and a pin at the fore end of an operating lever is fitted in the coupling hole and the two are subjected to a hardening process to secure a fit which is free of back-lash for a long time. However, applying such a hardening process to a part of the side plate of the bracket involves great difficulties in working.

SUMMARY OF THE INVENTION

It is an object of the present invention to eliminate such difficulties and to provide a tilt type steering device of such construction that the driver's favorite driving position can be selected by a simple operation and once the driving position is selected, the steering wheel can be again positioned from the jumped-up position to the selected position when the next driving is effected.

To achieve such object, according to the present invention, a rod having fixed thereto a connecting plate having therein a plurality of coupling holes substantially equal in diameter is rotatably and axially movably supported by the side plates of one bracket and the connecting plate is biased by biasing means in such a direction that the connecting plate is urged against one side plate of the other bracket, this side plate being provided with a coupling projection capable of fitting in the coupling holes, and an operating lever connected to the rod is operated so as to impart to the rod an axial movement against the biasing means to thereby disengage the coupling holes from the coupling projection and an engaging portion for selection provided on the operating lever or the rod is restrained by the restraining portion of a selector device provided on the bracket supporting the rod and this restrained position is changed by rotating the operating lever, whereby the selected position in which the coupling projection fits in any one of the coupling holes to connect the upper and lower columns at a selected inclination can be changed.

The invention will become more fully apparent from the following detailed description thereof taken in conjunction with the accompanying drawings.

DESCRIPTION OF THE PREFERRED EMBODIMENTS

Figure 1:
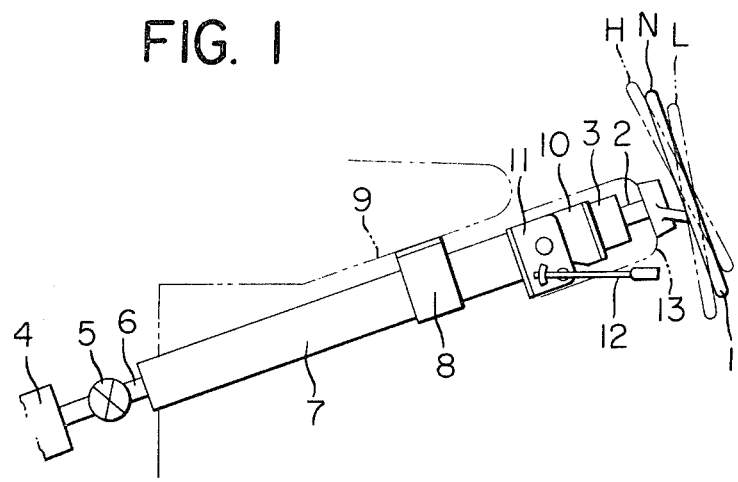
FIG. 1 is a side view showing the manner in which a first embodiment of the steering device of the present invention is mounted to a vehicle body.
Figure 2:
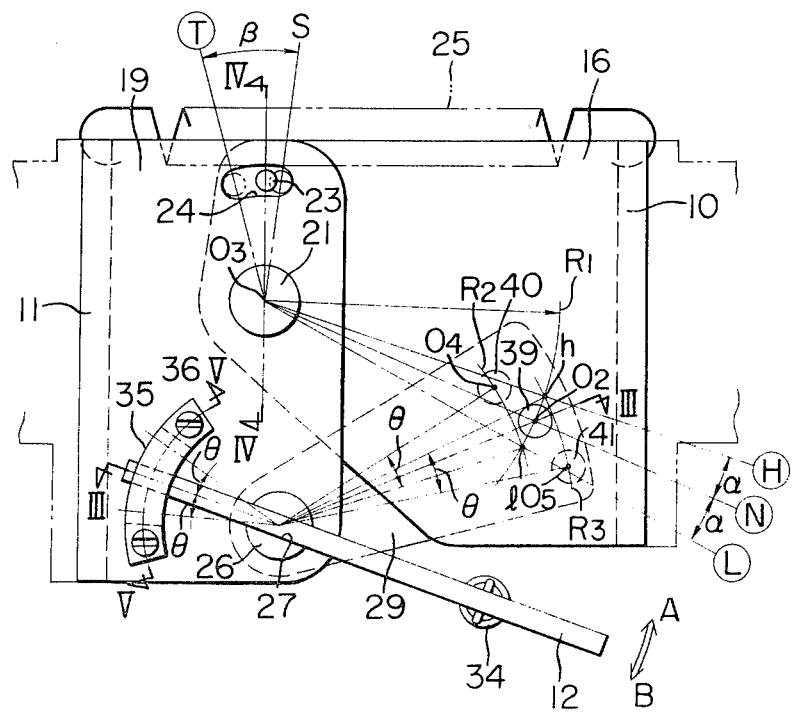
FIG. 2 is a side view showing the essential portions of the tilt mechanism of the first embodiment.
Figure 3:
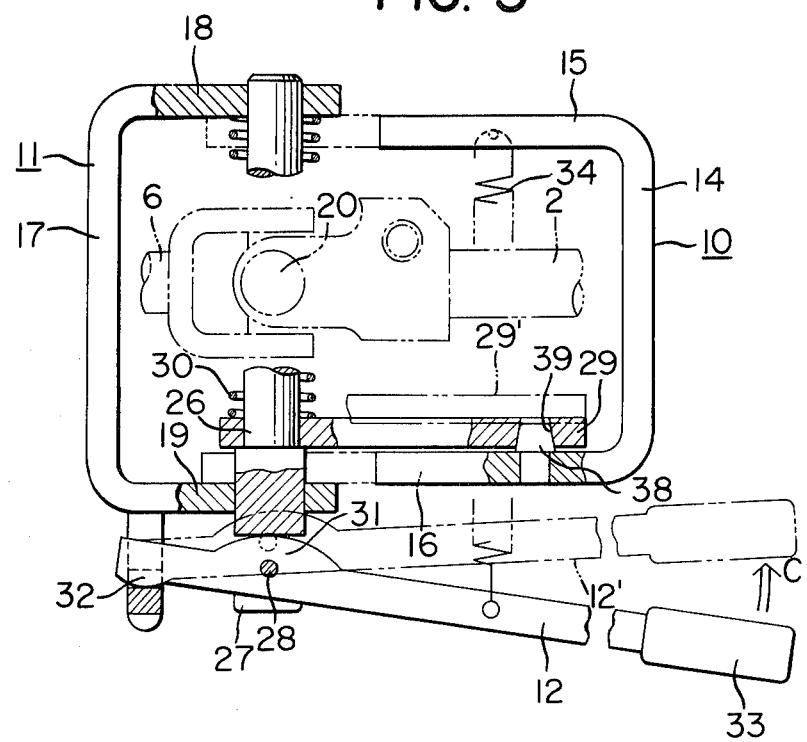
FIG. 3 is a plan view, partly in cross section, taken along arrow III of FIG. 2.
Figure 4:
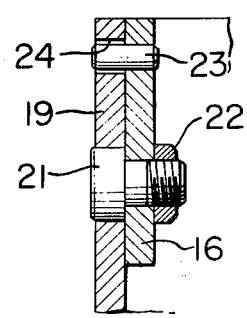
FIG. 4 is a cross-sectional view taken along line IV—IV of FIG. 2.
Figure 5:
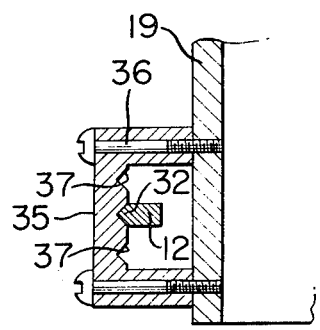
FIG. 5 is a cross-sectional view taken along line V—V of FIG. 2.

The construction of the present invention will hereinafter be described with respect to a first embodiment. Referring to FIG. 1, an upper shaft 2 having a steering wheel 1 mounted thereto is rotatably supported by an upper column 3, and a lower shaft 6 connected to a steering gear 4 through a universal joint 5 is fitted in a lower column 7. The lower column 7 is mounted on a vehicle body portion 9 by means of a column bracket 8 fixed to the lower column 7, and the upper shaft 2 and the lower shaft 6 are tiltably connected to each other by a universal joint 20 indicated by dots-and-dash line in FIG. 3. The base of an upper bracket 10 is secured to the lower portion of the upper column 3 by means such as a bolt or the like, and the base of a lower bracket 11 is likewise secured to the upper portion of the lower column 7, the brackets 10 and 11 being connected to each other in a manner which will hereinafter be described. A cowl 13 indicated by dots-and-dash line in FIG. 1 covers the upper portion of the steering device, and an operating lever 12 projects outwardly from the side thereof. In FIGS. 2 to 5 which shows the steering wheel 1 in its neutral position N indicated by solid line in FIG. 1, there are downwardly extending right side plate 15 and a downwardly extending left side plate 16 on the upper bracket 10 on the opposite sides of the base 14 thereof and there are an upwardly extending right side plate 18 and an upwardly extending left side plate 19 on the lower bracket 11 on the opposite sides of the base 17 thereof, and the side plates 18 and 19 of the lower bracket 11 overlap the outer sides of the side plates 15 and 16 of the upper bracket 10, respectively, and the upper bracket 10 and the lower bracket 11 are tiltably connected to each other by two connecting members 21 on the center line of a universal joint 20 indicated by dots-and-dash line in FIG. 3. The universal joint 20 is connected between the upper and lower shafts 2 and 6 extending through apertures (not shown) formed in the bases 14 and 17 of the brackets 10 and 11. As shown in FIG. 4, the cylindrical head of the connecting member 21 is pivotably fitted in cylindrical holes formed in the side plates 18 and 19 of the lower bracket 11 positioned outwardly, and the shank portion of the connecting member 21 is fitted in the side plates 15 and 16 of the upper bracket 10 positioned inwardly and is fixed by a nut 22. A stopper pin 23 is driven into the left side plate 16 of the upper bracket 10 above the connecting member 21, and the stopper pin 23 is fitted in an arcuate slot 24 formed in the left side plate 19 of the lower bracket 11 and forms an angle limiting device for controlling the range of tilting movement of the upper and lower brackets 10 and 11 about the connecting member 21. The upper and lower brackets 10 and 11 are normally pulled by a tension spring 25 shown in FIG. 2 and unless restrained by other function, they assume a tilted position in which the stopper pin 23 has been moved and stopped to contact the left end of the slot 24. The line passing through the then center of the stopper pin 23 and the center of rotation $O_3$ of the connecting member 21 is indicated by Ⓣ and in this condition, the steering wheel is said to assume a jumped-up position. Also, assuming that the line passing through the center of the stopper pin 23 and the center of rotation $O_3$ of the connecting member 21 when the stopper pin 23 has come into contact with the right end of the slot 24 is S, the angle formed between the line Ⓣ and the line S is the maximum inclination $\beta$ of the upper and lower brackets 10 and 11. The side plates 15 and 16 of the upper bracket 10 are slantly cut away in the portion thereof below the connecting member 21, and that portion is not superposed upon the lower bracket 11. In this portion which is not superposed, the side plates 18 and 19 of the lower bracket 11 support a rod 26 for rotation and axial movement. As shown in FIG. 3, the rod 26 comprises an end portion which is relatively large in diameter and short in length and a shaft portion which is relatively small in diameter and long, the end portion being supported by the left side plate 19 and the shaft portion being supported by the right side plate 18. About one half of the end portion projects outwardly of the left side plate 19 and a sliding split 27 is provided there and an operating lever 12 is fitted thereto and pivotally mounted by a pin 28. The end portion of the rod 26 is connected to the shaft portion within the left side plate 19 and a stepped portion is formed at the boundary therebetween. By this stepped portion, the axial positioning is accomplished and the boss portion of a connecting plate 29 is fitted on the shaft portion of the rod 26 and, by means of a set screw, a key or welding, the connecting plate 29 is fixed against rotation relative to the rod 26. The position of the stepped portion of the rod 26 is determined so that the connecting plate 29 occupies a position proximate to the left side plate 16 of the upper bracket. A compression spring 30 having one end in contact with the connecting plate 29 and having the other end in contact with the right side plate 18 is fitted on the shaft portion of the rod 26 and normally biases the connecting plate 29 axially of the rod 26 toward the left side plate 19. The operating lever 12 has an arcuate bulged portion 31 adapted to contact the bottom of the sliding split 27 in the portion thereof which is pivotally connected to the rod 26, and also has a protrusion 32 of triangular cross section on the outer side surface thereof which is forward of arcuate bulged portion 31. The rear end of the operating lever which is adjacent to the steering wheel 1 provides a knob 33, and a tension spring 34 is mounted to a portion of the lever 12 between the pivotally connected portion and the knob 33. The other end of the tension spring 34 is restrained by the right side plate 15 of the upper bracket 10 and biases the operating lever 12 in a direction opposite to the direction of arrow C of FIG. 3. As shown in FIG. 5, the block 35 of a selector device is fixed to the left side plate 19 of the lower bracket 11 at a position to which the fore end of the operating lever 12 corresponds, by means of small screws 36. As seen in FIG. 2, the block 35 is a member curved into an arcuate form centered at the center of rotation $O_1$ of the rod 26 and, in the embodiment shown, three recesses 37 are provided in the underside of the block 35 as shown in FIG. 5 to restrain the fore end protrusion 32 of the operating lever 12. The recesses 37 are triangular grooves corresponding to the protrusion 32 and the number of these recesses is not limited to three. When the steering wheel 1 is in its neutral position indicated by N in FIG. 1, the protrusion 32 of the operating lever 12 is restrained in the middle recess 37, and the upper and lower recesses 37 are provided on radial lines forming arbitrarily selected angles $\theta$ (FIG. 2) relative to the middle recess 37 and passing through the center of rotation $O_1$. These two selected angles $\theta$ are angles which can be arbitrarily selected independently of the aforementioned maximum inclination $\beta$, and these two angles $\theta$ need not be equal to each other as in the embodiment shown. That is, the selected angle $\theta$ above the neutral position may differ from the selected angle $\theta$ below the neutral position. On the other hand, a coupling projection 38 having a tapered outer peripheral surface is provided on the inner side of the left side plate 16 of the upper bracket 10 which is adjacent to the base 14, and in the neutral position shown in FIG. 2, it is fitted in a first coupling hole 39 of tapered holes formed in the connecting plate 29. Now, let $O_2$ be the center of the first coupling hole 39, and depict an arc having the distance to the center $O_2$ of the first coupling hole 39 as the radius with the center of rotation $O_3$ of the connecting member 21 as the center, and define this arc as $R_1$. Let Ⓝ be the straight line passing through the center of rotation $O_3$ of the connecting member 21 and the center $O_2$ of the first coupling hole 39, and let Ⓛ and Ⓗ be the straight lines passing through said center of rotation $O_3$ and forming a tilt angle $\alpha$ with the straight line Ⓝ. Let l and h be the points of intersection between the straight lines Ⓛ and Ⓗ the arc $R_1$ and $O_4$ and $O_5$ be the points of intersection between the straight line forming on the first coupling hole side a selected angle $\theta$ with respect to the straight lines $O_1 l$ and $O_1 h$ and passing through said center of rotation $O_1$, and the arcs $R_2$ and $R_3$ centered at said center of rotation $O_1$ and having the distances to the points of intersection l and h as the radii. When the steering wheel 1 is in a position indicated by L in FIG. 1, the point of intersection $O_4$ is the center of a coupling hole 40 and, when the steering wheel 1 is in a position indicated by H in FIG. 1, the point of intersection $O_5$ is the center of a coupling hole 41. The coupling holes 40 and 41 may be provided at such positions. As regards said tilt angle $\alpha$, there are several tilt angles $\alpha$ less than the maximum inclination $\beta$ and the tilt angles are suitably determined with the maximum inclination $\beta$ and the number of tilt positions taken into account so that the jumped-up position can be secured further above the upper tilt position.

If the operating lever 12 is moved by the selected angle $\theta$ in the direction of arrow A of FIG. 2 while being pushed in the direction of arrow C of FIG. 3, the rod 26 is rotated and the connecting plate 29 fixed to the rod 26 is also rotated counter-clockwisely by the angle $\theta$ and the center of the coupling hole 41 at the position H moves to the point of intersection h between the arc $R_1$ and the straight line Ⓗ. When the upper bracket 10 is tilted in the direction of arrow A about the connecting member 21, the center of the coupling projection 38 moves on the arc $R_1$ by the tilt angle $\alpha$ and becomes coincident with the point of intersection h. That is, the center of the coupling projection 38 becomes coincident with the center of the coupling hole 41 at the position H and the two mate with each other.

This is the position H of the steering wheel 1 indicated by dots-and-dash line in FIG. 1. Conversely, if the operating lever 12 is moved by the angle θ in the direction of arrow B, the center of the coupling hole 40 at the position L moves to the point of intersection l and if the bracket 10 is then tilted in the direction of arrow B, the coupling projection 38 fits in the coupling hole 40 at the position L and the steering wheel 1 assumes the position L of FIG. 1. In this manner, the other coupling holes than the first coupling hole 39 are provided at such positions that the fore end protrusion 32 of the operating lever 12 is restrained in the recess 37 in the selector device which is in any other position than the neutral position and the connecting plate 29 is rotated with the operating lever 12 and the upper and lower columns 3 and 7 assume selected inclinations with a result that the coupling projection 38 of the upper bracket 10 fits in the coupling hole.

Operation will now be described. In FIG. 3, when the operating lever 12 is moved in the direction of arrow C, namely, rightwardly to the driver, the operating lever 12 moves to a position indicated by dots-and-dash line 12' with the fore end protrusion 32 thereof as the fulcrum. The bulged portion 31 at the pivotally connected portion of the operating lever 12 pushes the bottom of the sliding split 27 of the rod 26 and moves the rod 26 axially against the force of the compression spring 30. The bulged portion 31 is not always necessary, but the movement of the operating lever 12 is transmitted to the rod 26 through the pin 28 as well and in this case, the diameter of the pin 28 must be large enough to resist the spring force. Along with the axial movement of the rod 26, the connecting plate 29 fixed to the rod 26 is also moved so that the first coupling hole 39 becomes disengaged from the coupling projection 38 provided on the left side plate 16 of the upper bracket 10. The then position of the connecting plate 29 is indicated by dots-and-dash line 29'. Thus, the upper and lower brackets 10 and 11 are liberated from the restraint in the rotational direction and therefore, the upper bracket 10 is rotated in the direction of arrow A of FIG. 2 by the spring force of the tension spring 25 having its opposite ends secured to the upper and lower brackets 10 and 11, and stopper pin 23 of the angle limiting device comes to its jumped-up position in which it contacts the left end portion of the slot 24. At this time, the steering wheel 1 upwardly tilts further greatly than the position H indicated by dots-and-dash line in FIG. 1. In this jumped-up position, the driver can very easily get on and off the driver's seat without being hindered by the steering wheel 1 because the lower end of the steering wheel 1 is greatly spaced apart from the seat. When the driver takes the driver's seat and tilts the steering wheel 1 toward this side, the upper bracket 10 tilts with the steering wheel 1 and the coupling projection 38 provided on the left side plate 16 returns to a position in which it can fit into the first coupling hole 39 of the connecting plate 29, and the rod 26 is axially returned by the spring force of the compression spring 30, so that the coupling projection 38 fits into the coupling hole 39. In the meantime, the coupling projection 38 is urged against the left side surface of the connecting plate 29, but since only the first coupling hole 39 exists on the arc $R_1$ centered at the center of rotation $O_3$ of the connecting member 21, the upper and lower brackets 10 and 11, or in other words, the upper and lower columns 3 and 7, are not coupled together in other position during the time that they reciprocate between the jumped-up position and the neutral position. Next, when the operating lever 12 is further moved in the direction of arrow A of FIG. 2 while being moved in the direction of arrow C of FIG. 3 as previously described, the fore end protrusion 32 of the operating lever 12 moves from the middle recess 37 of the selector device to the lower recess 37 as viewed in FIG. 5. Along therewith, the rod 26 and the connecting plate 29 are rotated by the selected angle θ in the direction of arrow A of FIG. 2, and the center of the coupling hole 41 in the position H moves on the arc $R_3$ and becomes coincident with the point of intersection h. At this point, the hand is released from the operating lever 12 and the steering wheel 1 is grasped by the hand and is tilted in the direction of arrow A, namely, upwardly, with the aid of the tension spring 25, whereupon the center of the coupling projection 38 of the upper bracket 10 moves along the arc $R_1$ centered at the center of rotation $O_3$ of the coupling member 21, and the center $O_5$ of the coupling hole 41 in the position H becomes coincident with the point of intersection h on the arc $R_3$ centered at the rod 26, and the rod 26 is axially moved by the spring force of the spring 30, so that the coupling projection 38 fits into the coupling hole 41. Thus, the upper and lower brackets 10 and 11 become coupled together while being inclined by the tilt angle α and the steering wheel 1 assumes the position indicated by H in FIG. 1. Likewise, when the operating lever 12 is moved in the direction of arrow B of FIG. 2, the coupling projection 38 fits into the coupling hole 40 in the position L and couples the upper and lower brackets 10 and 11 together and thus, the steering wheel 1 assumes the position indicated by L in FIG. 1.

Even when the position of the steering wheel 1 is determined to any other position than such neutral position, the steering wheel 1 jumps up to the jumped-up position by the operating lever 12 being moved in the direction of arrow C of FIG. 3, and the steering wheel 1 can be returned from the jumped-up position to the position H or the position L by the steering wheel 1 alone being moved. This is because only one coupling hole exists on the arc $R_1$ centered at the connecting member 21 and no wrong coupling to other positions can occur.

Figure 6:
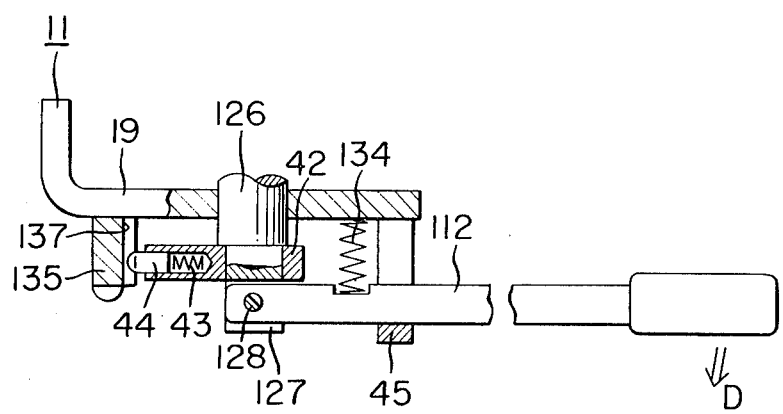
FIG. 6 is a cross-sectional view of essential portions corresponding to FIG. 3 but showing another embodiment.
Figure 7:
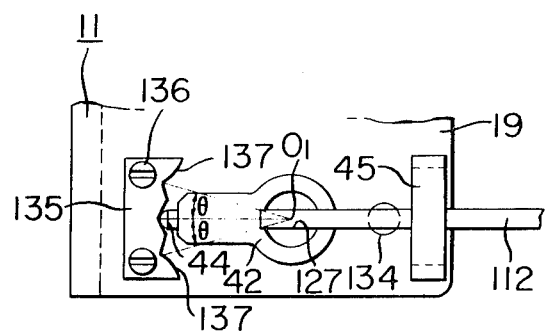
FIG. 7 is a side view of the embodiment shown in FIG. 6.

FIGS. 6 and 7 show an embodiment in which the rod, the operating lever and the selector device differ from those in the above-described embodiment. As in the above-described embodiment, the connecting plate 29 is fixed to the rod 126 and the rod 126 rotatably and axially movably supported by the opposite side plates 18 and 19 of the lower bracket 11 is provided with a small-diametered portion in the fore end portion projected outwardly of the left side plate 19, and a plate 42 is fixed to the small-diametered portion by means similar to the connecting plate. A sliding split 127 is provided in a further fore end of the rod 126 and the fore end of an operating lever 112 fits in the sliding split 127 and is pivotally connected thereto by a pin 128. The plate 42 comprises a boss portion fitted on the rod 126, and an arm portion extending from the boss portion toward the fore end of the operating lever 112. The arm portion is formed with a hole in which are fitted a compression spring 43 and a sliding pin 44 which provides a selecting protrusion outwardly biased by the compression spring 43. The block 135 of the selector device is fixed to the left side plate 19 at a position corresponding to the tip end of the sliding pin 44, by means of small screws 136. A gate-shaped lever fulcrum block 45 is secured to the left side plate 19 on the opposite side of the block 135 with respect to the rod 126 by welding or any other suitable means, and it supports the operating lever 112 from outside. At an intermediate position between the rod 126 and the lever fulcrum block 45, a compression spring 134 has its opposite ends urged against the left side plate 19 and the inner side surface of the operating lever 112. The inner side surface of the operating lever 112 is formed with a cut-away for containing one end of the compression spring 134 therein, and a guide pin (not shown) is studded in the cut-away to hold the compression spring 134, the other end of which is covered with a cup-like member. Three recesses 137 are formed in the side surface of the block 135 of the selector device which is adjacent to the rod 126 and, when the steering wheel 1 is in its neutral position, the sliding pin 44 is restrained in the middle recess 137 as viewed in FIG. 7, and the upper and lower recesses 137 are provided at radial positions passing through the center of rotation $O_1$ of the rod 126 at any selected angle $\theta$ with respect to the middle recess 137. In the other points, the second embodiment is similar to the first embodiment and, if the operating lever 112 is moved in the direction of arrow D of FIG. 6, namely, leftwardly to the driver, the end of the operating lever 112 pivotally connected to the rod 126 is moved upwardly as viewed in FIG. 6 with the lever fulcrum block 45 as the fulcrum, to thereby move the rod 126 axially upwardly, whereby the coupling projection 38 shown in FIG. 3 becomes disengaged from the coupling hole.

While the selector device is provided on the left side plate 19, it may be provided on the right side plate 18 and the plate 42 having the sliding pin 44 may be fixed to the end of the rod 126 which projects outwardly from the right side plate 18. That is, the operating lever 112 is pivotally connected to one end of the rod 126 and the plate 42 is fixed to the other end of the rod 126. Also, if a pin is provided on the left side plate 19 and the fore end of the operating lever is pivotally mounted on the pin and the fore end of the rod is positioned with a slight clearance with respect to the inner side surface of the operating lever so that when the operating lever 112 is moved in the direction opposite to the direction of arrow D of FIG. 6, the rod 126 can be moved by being axially pushed by the operating lever 112, and an arm is fixed to the fore end of the rod and the end of the arm is formed with a pin-hole in which is fitted a long pin studded in the operating lever 112 so that rotation of the operating lever is transmitted to the rod 126, then the angle of rotation of the rod will become greater than the angle of rotation of the operating lever 112 That is, if the operating lever 112 is rotated by any selected angle $\theta$ of the selector device, the rod 126 will rotate by an angle greater than $\theta$. If this is done, the spacing between the coupling holes provided in the connecting plate 29 can be made greater and this will solve the problem of strength which may arise when the spacing between the coupling holes is small.

The tilt type steering device of the present invention constructed as described above is a tilt type steering device provided with a memory device in which the steering wheel can be moved to the jumped-up position by simple operation of the operating lever and which readily permits the driver to get on and off the driver's seat and in which the steering wheel can without fail return from the jumped-up position to the pre-selected driving position and can be coupled, and moreover, the coupling holes are provided in the connecting plate fixed to the rod and this eliminates the necessity that the connecting hole which must be subjected to a hardening process be provided in the bracket which requires a bending process and thus, the machining of the bracket becomes easy to do and this leads to a reduced manufacturing cost.

Also, in the present invention, the aforementioned points $O_2$, 1 and h are the coupling center points whereat the coupling projection 38 is coupled to any of the coupling holes 39, 40 and 41 in the tilt positions and when three triangles are assumed in which said coupling center points $O_2$, 1 and h are the vertices and the straight line passing through the center of rotation $O_3$ of the connecting member 21 and the center of rotation $O_1$ of the rod 26 is the base, the base is common and another side is the common radius $R_1$ and the other side is the straight line $\overline{O_1O_2}$, the radius $R_2$ and the radius $R_3$, but the actual tilt angle $\alpha$ is about 3° at greatest and therefore, the difference between the radius $R_2$ and the radius $R_3$ is relatively small and the difference in the length of said other side of the three triangles may be said to be small. The force acting on the three points of the triangle in the tilt steering, namely, the coupling center point, the center of rotation of the connecting member 21 and the center of rotation of the rod becomes greater in inverse proportion to the length of said other side of the triangle and the back-lash in the connecting member and rod also increases in inverse proportion to the length of said other side and therefore, in the device of the present invention wherein the variation in the length of said other side is small, the rigidity in each tilt position is stable and the back-lash is small, and such effect is more remarkable as the number of tilt positions is increased.

The lower bracket 11 may be made integrally with the column bracket 8, and the rod has been shown as being provided on the lower bracket 11, but this is because there is the advantage that the position of the coupling hole to be provided in the connecting plate 29 can be obtained through simple construction, and the rod may also be supported by the upper bracket.

I claim:

1. A tilt type steering device comprising:
   an upper shaft having a steering wheel mounted thereon;
   a lower shaft connected to a steering gear;
   a universal joint connecting said two shafts together;
   an upper bracket provided on an upper column rotatably supporting said upper shaft, said upper bracket having side plates;
   a lower bracket provided on a lower column fitted on said lower shaft and mounted to a vehicle body portion, said lower bracket having side plates partly overlapping the side plates of said upper bracket;
   angle limiting means for making said upper bracket tiltable in a predetermined angle range relative to said lower bracket about the center line of said universal joint;
   first biasing means for biasing said upper bracket so that said upper bracket tilts in a jumped-up tilt limit direction relative to said lower bracket;
   a rod member rotatably and axially movably supported by the other portion of the side plates of one of said upper and lower brackets than said overlapping portion;

a connecting member fixed to said rod member adjacent to the side plate of the other of said upper and lower brackets, said connecting member having therein coupling holes substantially equal in diameter;

second biasing means for biasing said connecting member axially of said rod member so that said connecting member is urged toward the side plate of said other bracket;

an operating member coupled to said rod member for imparting to said rod member rotation and axial movement against said second biasing means;

selector means provided on said one bracket, said selector means being provided with a plurality of restraining portions disposed around the center of rotation of said rod member with a predetermined selected angle therebetween;

an engaging portion provided on one of said rod member and said operating member and restrained by one of said restraining portions of said selector means; and a coupling projection provided on the side plate of said other bracket adjacent to said connecting member and capable of fitting in said coupling holes, said coupling projection being capable of fitting in one of the coupling holes of said connecting member which corresponds to one of said restraining portions which restrains said engaging portion when said operating member is operated to move said rod member in axial direction and in rotational direction so that said engaging portion is restrained by one of said restraining portions;

whereby when said coupling projection fits in one of said coupling holes and said upper and lower columns are connected together at an inclination corresponding thereto, said operating member is operated to move said rod member axially against said second biasing means and withdraw said coupling hole of said connecting member from said coupling projection, and said upper bracket is inclined at a jumped-up tilt limit angle relative to said lower bracket by said first biasing means, whereafter said operating member is continuedly operated to rotate said rod member so that said engaging portion is restrained by any other one of said restraining portions, and then the steering wheel mounted on said upper shaft is moved up and down, whereupon said coupling projection fits in any other one of said coupling holes and said upper and lower columns are connected together at a different inclination corresponding thereto.

* * * * *